US012145836B1

(12) United States Patent
Lai

(10) Patent No.: US 12,145,836 B1
(45) Date of Patent: Nov. 19, 2024

(54) FUEL TANK

(71) Applicant: ZHONGSHAN PEILI TECHNOLOGY CO., LTD., Zhongshan (CN)

(72) Inventor: Chunlai Lai, Ruijin (CN)

(73) Assignee: ZHONGSHAN PEILI TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 18/775,438

(22) Filed: Jul. 17, 2024

(51) Int. Cl.
*B67D 7/04* (2010.01)
*B67D 7/38* (2010.01)
*B67D 7/42* (2010.01)
*B67D 7/58* (2010.01)
*B67D 7/84* (2010.01)

(52) U.S. Cl.
CPC ................. *B67D 7/04* (2013.01); *B67D 7/38* (2013.01); *B67D 7/42* (2013.01); *B67D 7/58* (2013.01); *B67D 7/84* (2013.01)

(58) Field of Classification Search
CPC ... B67D 7/04; B67D 7/38; B67D 7/42; B67D 7/58; B67D 7/84
See application file for complete search history.

(56) References Cited

U.S. PATENT DOCUMENTS 3,910,464 A * 10/1975 Schlanzky ............ F04D 29/669 222/333
6,474,443 B2 * 11/2002 Kearns ................. F01M 11/045 137/205
6,929,018 B2 * 8/2005 Shepard .............. G01M 3/2892 137/565.17
7,575,015 B2 * 8/2009 Reid ................... G01M 3/2892 141/86
8,201,588 B2 * 6/2012 Bonner .................. B67D 7/048 141/59
8,347,926 B2 * 1/2013 Voss, III ............ B60K 15/0406 141/323
2014/0230958 A1 * 8/2014 Bonner .................... B67D 7/60 141/59
2023/0167792 A1 * 6/2023 Bykowski .............. F02M 37/22 123/198 C

* cited by examiner

*Primary Examiner* — Frederick C Nicolas
(74) *Attorney, Agent, or Firm* — Daniel M. Cohn; Howard M. Cohn

(57) ABSTRACT

A fuel tank includes a tank body, a discharge pipe, and a fuel pump. The tank body includes a bottom portion and a top portion opposite to the bottom portion, a fuel inlet and a fuel outlet are defined in the top portion of the tank body. The discharge pipe includes a first pipe and a second pipe. The first pipe and the second pipe are connected to each other. The first pipe is disposed in the tank body and extends in a height direction of the tank body. The second pipe is communicated with the fuel outlet. The fuel pump is disposed in the first pipe. The first pipe defines a first end surface away from the bottom portion of the tank body. A bottom portion of the fuel inlet is lower than the first end surface in the height direction of the tank body.

20 Claims, 7 Drawing Sheets

FUEL TANK

TECHNICAL FIELD

The present disclosure relates to a field of fuel tanks, and in particular to a fuel tank.

BACKGROUND

In industry and daily life, fuel tanks are commonly used. Especially in situations where mobile refueling is required, fuel is first filled into a fuel tank from a gas station or a fuel barrel, and then after the fuel tank is moved to another place, the fuel tank supplies fuel for a corresponding device. For example, the fuel tank is first filled with the fuel from the gas station, and then the fuel tank is placed in a device such as a lawn mower, so that the fuel tank is able to supply the fuel to the lawn mower. Specifically, the fuel tank generally comprises a fuel pump, which is configured to pump the fuel in the fuel tank to an outside to facilitate discharge of the fuel. However, in the fuel tank of the prior art, the fuel is easy to overflow from a fuel outlet thereof during a refueling process.

SUMMARY

The present disclosure provides a fuel tank that solves a problem that fuel is easy to overflow from a fuel outlet of a conventional fuel tank during a refueling process.

The fuel tank comprises a tank body, a discharge pipe, and a fuel pump. The tank body comprises a bottom portion and a top portion disposed opposite to the bottom portion, a fuel inlet and a fuel outlet are defined in the top portion of the tank body. The discharge pipe comprises a first pipe and a second pipe. The first pipe and the second pipe are connected to each other. The first pipe is disposed in the tank body and extends in a height direction of the tank body. The second pipe is communicated with the fuel outlet. The fuel pump is disposed in the first pipe.

The first pipe defines a first end surface away from the bottom portion of the tank body. A bottom portion of the fuel inlet is lower than the first end surface of the first pipe in the height direction of the tank body.

Optionally, a fuel inlet groove is defined in the top portion of the tank body, and the fuel inlet is defined in a bottom wall of the fuel inlet groove.

Optionally, the fuel tank further comprises a nozzle communicated with the fuel outlet. The fuel pump is disposed close to the bottom portion of the tank body. When the nozzle is closed, air is sealed in the discharge pipe.

Optionally, a clamping groove is defined in the top portion of the tank body. The nozzle is insertable into the clamping groove.

Optionally, the tank body comprises a main body and a guide pipe. The main body defines an opening. The guide pipe is gaplessly installed in the opening. The clamping groove is defined in the guide pipe.

Optionally, the tank body further comprises a sealing ring disposed between the guide pipe and the main body, so that the guide pipe is gaplessly installed in the opening.

Optionally, the fuel tank further comprises a hose. The hose is connected to the nozzle and is communicates with the fuel outlet. At least one hose holder is defined on an outer side wall of the tank body. The hose is allowed to be snapped in the at least one hose holder.

Optionally, a handle is disposed on the top portion of the tank body. A grabbing groove is defined in the bottom portion of the tank body.

Optionally, the bottom portion of the tank body comprises a bottom plate, a fuel guide groove is defined in the bottom plate. The fuel pump is at least partially disposed in the fuel guide groove.

Optionally, the fuel guide groove comprises a limiting section. The fuel pump is disposed in the limiting section. The limiting section comprises a limiting side wall, and the limiting side wall is disposed around the fuel pump and limits a position of the fuel pump.

Optionally, the first pipe is a hard pipe. The fuel pump is clamped at one end of the first pipe close to the bottom plate. At least one of the first pipe and the fuel pump abuts against the bottom plate.

Optionally, the discharge pipe further comprises a sleeve pipe. The sleeve pipe is connected to one side of the second pipe toward the first pipe. The sleeve pipe is disposed in the fuel outlet and is sleeved on the first pipe. The sleeve pipe is gaplessly connected to the tank body.

Optionally, the second pipe is disposed outside the tank body and extends in a length direction of the tank body.

Optionally, the second pipe defines a first opening, a second opening, and a third opening. The first opening is communicated with the first pipe. The second opening and the third opening are disposed opposite to each other. The second opening is configured for discharging fuel.

The fuel tank further comprises a sealing piece, a circuit board, and wires. The sealing piece is gaplessly connected to the third opening. The wires pass through the sealing piece and are gaplessly connected to the sealing piece. A first end of each of the wires is electrically connected to the circuit board, and a second end of each of the wires is electrically connected to the fuel pump.

Optionally, the sealing piece comprises wiring through holes. The wires respectively pass through the wiring through holes and are respectively in interference fit with the wiring through holes.

Optionally, a mounting groove is defined in the top portion of the tank body. The fuel outlet is defined in a bottom wall of the mounting groove. An accommodating groove is defined in the bottom wall of the mounting groove. The second pipe is partially disposed in the accommodating groove.

Optionally, the fuel tank further comprises an electronic box. The electronic box comprises a base and an outlet cap. The base is installed in the mounting groove; the outlet cap covers the base. The second pipe is disposed on the base.

Optionally, the first pipe comprises a first section and a second section. The first section is detachably connected to the second section. The first section is fixedly connected to the second pipe. The second section is gaplessly connected to the first section.

Optionally, the discharge pipe further comprises a vent pipe. The vent pipe is connected to the second pipe and is communicated with the second pipe.

The fuel tank further comprises a vent valve. The vent valve is installed on one end of the vent pipe away from the second pipe. The sealing piece further defines a vent channel. A first end of the vent channel is communicated with the second pipe, and a second end of the vent channel is communicated with the vent pipe.

Optionally, the wiring through holes penetrate through the sealing piece in an extending direction of the second pipe. The wiring through holes are spaced apart from the vent channel. The vent pipe is connected to one side of the second pipe away from the first pipe.

The vent channel comprises a first vent section and a second vent section. The first vent section and the second vent section are communicated with each other. The first vent section extends in a width direction of the tank body and is communicated with the second pipe. The second vent section extends in the height direction of the tank body and is communicated with the vent pipe.

In the embodiments of the present disclosure, the fuel inlet and the fuel outlet are defined in the top portion of the tank body. The discharge pipe disposed in the tank body comprises the first pipe and the second pipe. The first pipe and the second pipe are connected to each other. The first pipe is disposed in the tank body and extends in the height direction of the tank body. The second pipe is connected between the first pipe and the fuel outlet. The fuel pump is disposed in the first pipe. The first pipe defines the first end surface away from the bottom portion of the tank body. The tank body comprises an enclosing wall surround the fuel inlet.

The enclosing wall comprises a second end surface away from the bottom portion of the tank body. In the height direction of the tank body, the second end surface of the enclosing wall is lower than the first end surface of the first pipe. When adding fuel into the tank body, the fuel first fills up to the second end surface of the enclosing wall, that is, the fuel first reaches the bottom portion of the fuel inlet. At this time, the fuel inside the tank body reaches a maximum safe storage height. If more fuel is added, the fuel may overflow from the fuel inlet. Therefore, during a process of adding fuel, it is ensured that a fuel storage height in the tank body is unable to reach the first end surface of the first pipe, which prevents the fuel from flowing back into the second pipe, thereby avoiding the fuel from overflowing from the fuel outlet.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

In the drawings.

Figure 1:
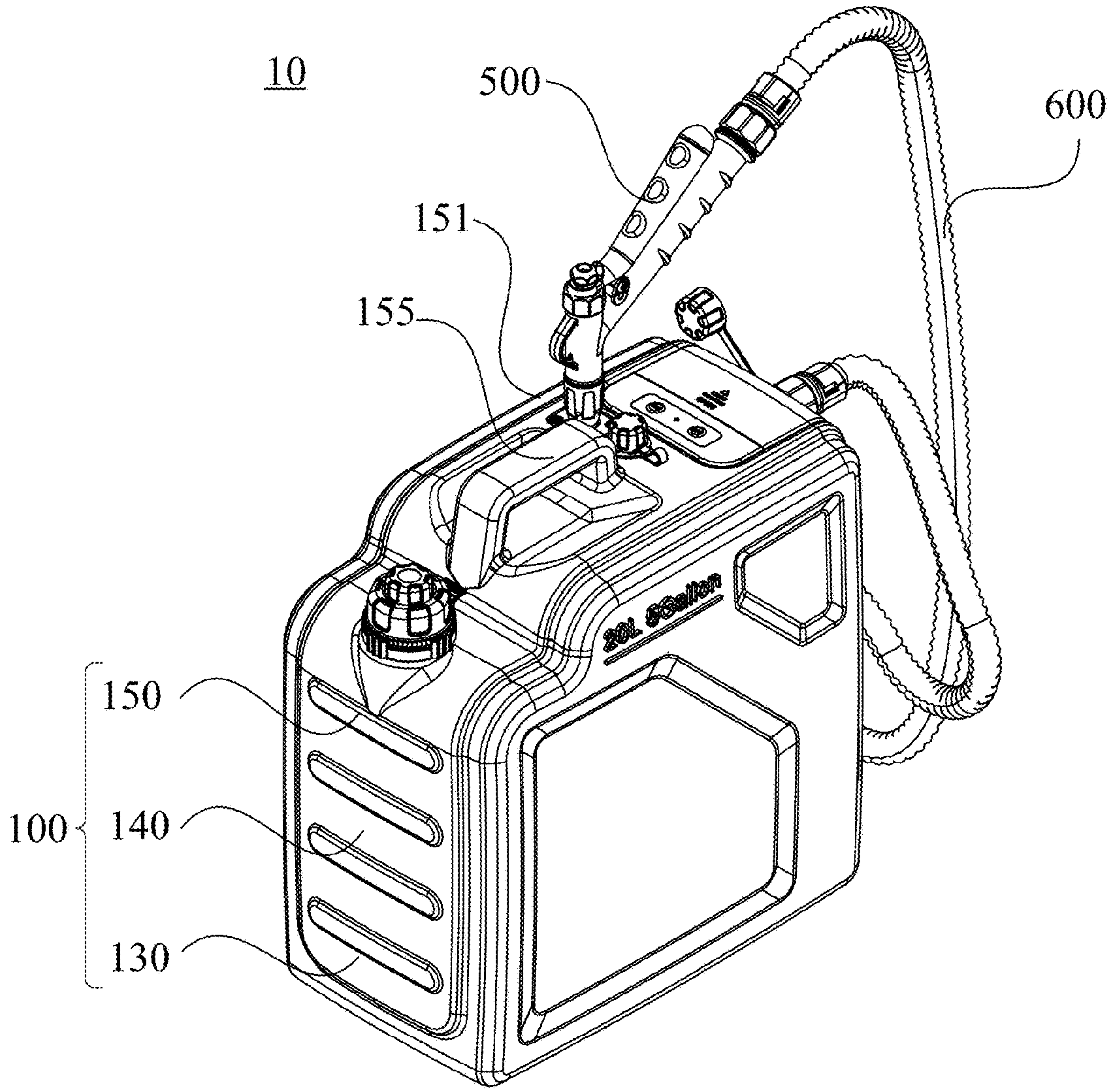
FIG. 1 is a structural schematic diagram of a fuel tank according to one embodiment of the present disclosure.

10—fuel tank, 100—tank body, 110—fuel inlet, 111—enclosingwall, 120—fuel outlet, 130—bottom portion of the tank body, 131—bottom plate, 132—fuel guide groove, 133—limiting section, 140—middle portion of the tank body, 150—top portion of the tank body, 151—top plate, L1—first end surface, L2—second end surface, 152—clamping groove, 153—mounting groove, 155—handle, 156—fuel inlet groove 160—main body, 161—grabbing groove, 170—guide pipe, 171—opening, 180—sealing ring, 190—hose holder, 200—discharge pipe, 210—first pipe, 211—first section, 212—second section, 220—second pipe, 221—first opening, 222—second opening, 223—third opening, 230—vent pipe, 240—vent valve, 250—sleeve pipe, 300—fuel pump, 500—nozzle, 600—hose, 700—sealing piece, 710—wiring through hole, 720—vent channel, 721—first vent section, 722—second vent section, 810—circuit board, 820—wire, 900—electronic box, 910—base, 920—outlet cap.

DETAILED DESCRIPTION

Technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure. In addition, it should be understood that the specific embodiments described herein are only used to illustrate and explain the present disclosure, and are not used to limit the present disclosure. In the present disclosure, unless otherwise stated, directional words, such as “upper” and “lower”, generally refer to upper and lower parts of a device in actual use or working state, which are specifically refer to the drawing direction in the accompanying drawings. Directional words such as “in” and “out” refer to the outline of the device.

Figure 2:
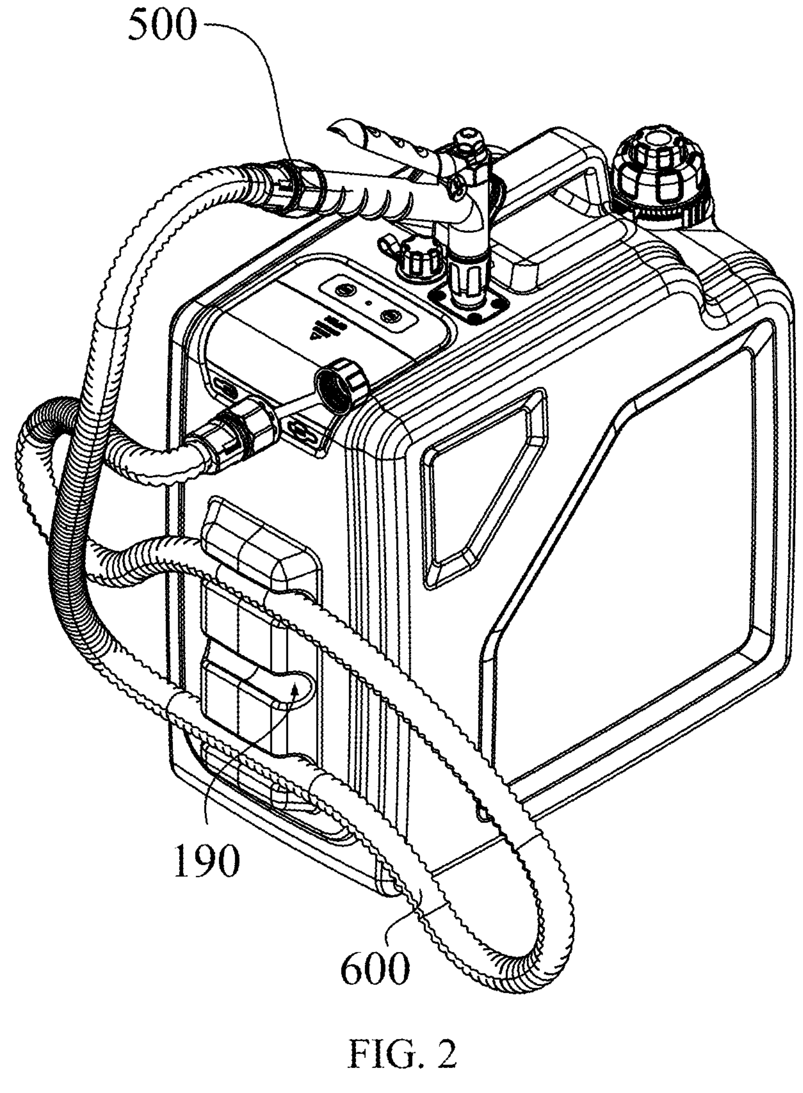
FIG. 2 is another structural schematic diagram of the fuel tank shown in FIG. 1.
Figure 3:
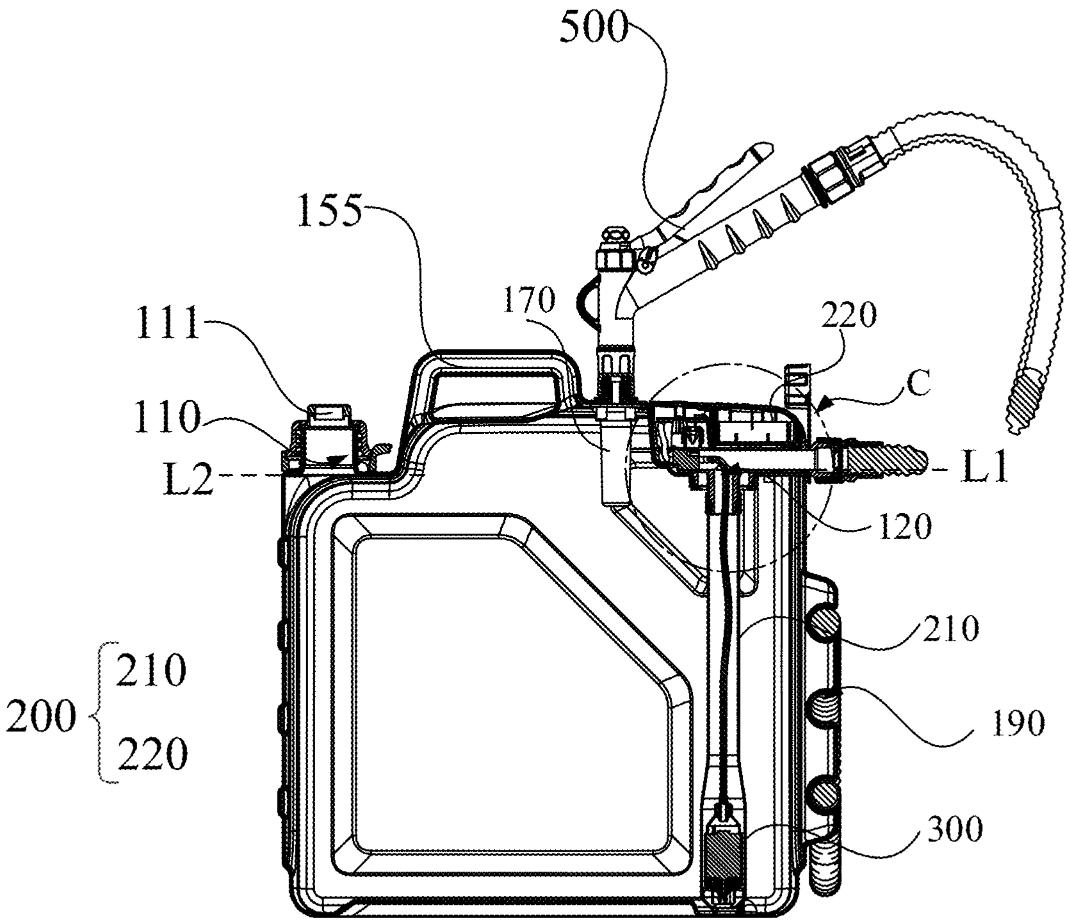
FIG. 3 is a first cross-sectional schematic diagram of the fuel tank shown in FIG. 1.

Embodiments of the present disclosure provide a fuel tank, which is illustrated with reference to the accompanying drawings. FIG. 1 is a structural schematic diagram of the fuel tank according to one embodiment of the present disclosure. FIG. 2 is another structural schematic diagram of the fuel tank shown in FIG. 1. FIG. 3 is a first cross-sectional schematic diagram of the fuel tank shown in FIG. 1.

The fuel tank 10 of the present disclosure comprises a tank body 100, a discharge pipe 200, and a fuel pump 300. The tank body 100 is a main structure for containing fuel. A containing space is defined inside the tank body 100 for storing the fuel. The tank body 100 comprises a bottom portion 130, a middle portion 140, and a top portion 150 disposed opposite to the bottom portion 130. For instance, the tank body 100 may be made of plastic, metal, alloy, or other materials. A fuel inlet 110 and a fuel outlet 120 are defined in the top portion 150 of the tank body 100. The containing space of the tank body 100 is communicated with the fuel inlet 110 and the fuel outlet 120. The fuel is added from the fuel inlet 110 defined in the top portion 150 of the fuel tank 10 and is discharge to an external device through the fuel outlet 120 defined in the top portion 150 of the fuel tank 10.

The discharge pipe 200 comprises a first pipe 210 and a second pipe 220. The first pipe 210 and the second pipe 220 are connected to each other. The first pipe 210 is disposed in the tank body 100 and extends in a height direction of the tank body 100. The second pipe 220 is communicated with the fuel outlet 120.

The fuel pump 300 is disposed in the first pipe 210. A main function of the fuel pump 300 is to generate sufficient pressure so that the fuel is enabled to flow smoothly from the tank body 100 to the fuel outlet 120, flow out of the fuel tank 10, and flow into the external device. Specifically, in the fuel tank 10, the fuel is stored in the containing space of the tank body 100. When the fuel needs to be supplied to the external device, the fuel pump 300 is turn on to generate pressure, so as to push the fuel through the first pipe 210 and the second pipe 220 into the external device.

The first pipe 210 defines a first end surface L1 away from the bottom portion 130 of the tank body 100. A bottom portion 130 of the fuel inlet 110 is lower than the first end surface L1 of the first pipe 210 in the height direction of the tank body 100. When adding the fuel into the tank body 100, the fuel first reaches the bottom portion of the fuel inlet 110. At this time, the fuel inside the tank body reaches a maximum safe storage height. If more fuel is added, the fuel may overflow from the fuel inlet 110. Therefore, during a process of adding fuel, it is ensured that a fuel storage height in the tank body 100 is unable to reach the first end surface L1 of the first pipe 210, which prevents the fuel from flowing back into the second pipe 220, thereby avoiding the fuel from overflowing from the fuel outlet 120. In the embodiment, by setting the bottom portion of the fuel inlet being higher than the first end surface L1 of the first pipe 210, the fuel storage height is effectively controlled to prevent the fuel from overflowing from the fuel outlet, thereby ensuring safety during a refueling process.

In some embodiments, the tank body 100 comprises an enclosing wall 111 surrounding the fuel inlet 110. The enclosing wall 111 defines a second end surface L2 away from the bottom portion 130 of the tank body 100. The second end surface L2 is lower than the first end surface L1. Specifically, the top portion 150 of the tank body 100 comprises a top plate 151 and upper portions of side walls of the tank body 100. The top plate 151 is located at a highest portion of the tank body 100. The fuel inlet 110 is defined in the top plate 151. The enclosing wall 111 surrounds the fuel inlet 110 and extends in the height direction of the tank body 100, thereby forming a protection and enclosure structure for the fuel inlet 110. Threads are disposed on an outer surface of the enclosing wall 111 and are configured to screw with a cover to seal the fuel tank 100. In the height direction of the tank body 100, the second end surface L2 is lower than the first end surface L1, When adding the fuel into the tank body 100, the fuel first fills up to the second end surface L2 of the enclosing wall 111, that is, the fuel first reaches the bottom portion of the fuel inlet 110. At this time, the fuel inside the tank body reaches a maximum safe storage height. If more fuel is added, the fuel may overflow from the fuel inlet 110. Therefore, during a process of adding fuel, it is ensured that the fuel storage height in the tank body is unable to reach the first end surface L1 of the first pipe 210, which prevents the fuel from flowing back into the second pipe 220, thereby avoiding the fuel from overflowing from the fuel outlet 120. In the embodiment, by setting the second end surface L2 being lower than the first end surface L1 of the first pipe 210, the fuel storage height is effectively controlled to prevent the fuel from overflowing from the fuel outlet, thereby ensuring the safety during the refueling process. In some embodiments, the tank body 100 may further comprise an anti-loosening structure that cooperates with the cover, and the anti-loosening structure is configured to limit a rotation of the cover.

In some embodiments, the fuel outlet 120 is defined in the top portion 150 of the tank body 100. For instance, the fuel outlet 120 is defined in an upper portion of the side walls of the tank body 100 to avoid occupying a space of the top plate 151. The first pipe 210 is disposed along the height direction of the tank body 100. The second pipe 220 is connected between the first pipe 210 and the fuel outlet 120. The second pipe 220 is disposed close to the top portion 150 of the tank body 100, which effectively prevents the fuel in the fuel tank 10 from freely entering the second pipe 220, thereby preventing the fuel from overflowing from the fuel outlet 120. It should be noted that a position of the fuel outlet 120 is able to be set as needed. For example, the fuel outlet 120 may be defined in the top plate 151 of the tank body 100, which is not limited thereto.

In some embodiments, the fuel tank 10 further comprises a nozzle 500 communicated with the fuel outlet 120. The fuel pump 300 is disposed close to the bottom portion 130 of the tank body 100. When the nozzle 500 is closed, air is sealed in the discharge pipe 200. The nozzle 500 is communicated with the fuel outlet 120. After the fuel is discharge from the fuel outlet 120, the fuel is transported to the external device that needs to be refueled through the nozzle 500. For instance, the fuel is sprayed into a container such as a car tank through a nozzle of the nozzle 500. The fuel pump 300 is disposed close to the bottom portion 130 of the tank body 100, which helps the fuel pump 300 to more effectively pump the fuel from the bottom portion 130 of the tank body 100, thereby improving the efficiency of fuel pumping.

When the nozzle 500 is closed, a hose passage defined by the fuel pump 300 defaults to a closed state. That is, the hose passage between the fuel pump 300 and the fuel outlet of the nozzle 500 is in a closed state and the air is sealed inside the discharge pipe, so that the air pressure inside the discharge pipe and an external air pressure are balanced, ensuring that when the nozzle 500 is not in use, the fuel does not flow into the discharge pipe 200 and does not enter the first pipe 210 and the second pipe 220, thereby preventing fuel leakage. Under actions of the fuel pump and the air inside the hose passage, fuel leakage is prevented in a non-refueling state, thereby improving the safety of the fuel tank 10. When the nozzle 500 is opened, the hose passage is opened, allowing the fuel to flow to the discharge pipe 200 and being discharge, so that the fuel is transported to external device.

Figure 4:
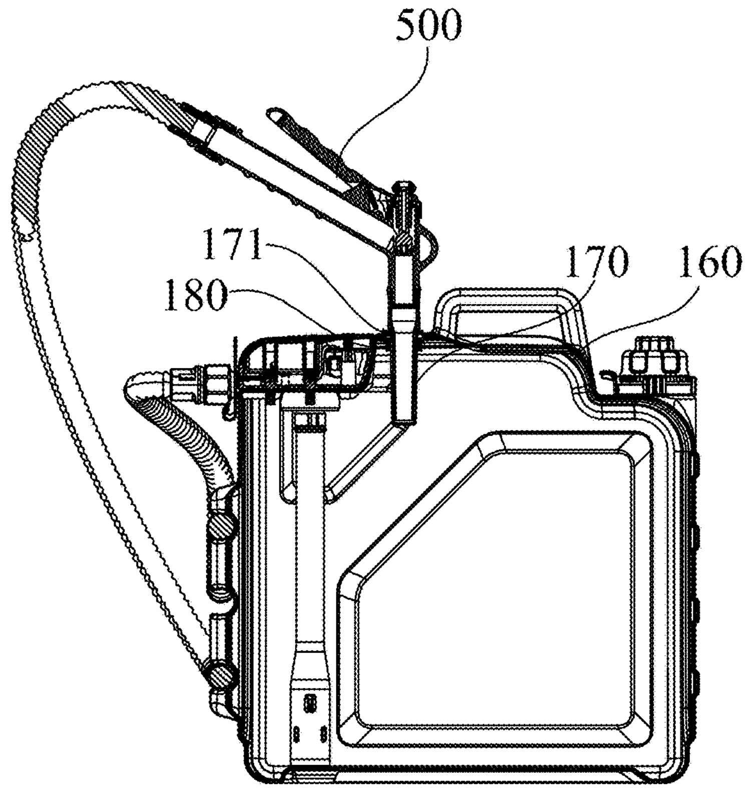
FIG. 4 is a second cross-sectional schematic diagram of the fuel tank shown in FIG. 1.

FIG. 4 is a second cross-sectional schematic diagram of the fuel tank shown in FIG. 1. In some embodiments, as shown in FIG. 4, a clamping groove 152 is defined in the top portion 150 of the tank body 100. The nozzle 500 is insertable into the clamping groove 152. The clamping groove 152 defines a space for fixing the nozzle 500, so that the nozzle 500 is allowed to be placed in the tank body 100, which not only facilitates storage of the nozzle 500, but also protects the nozzle 500, and prevent the nozzle 500 from being damaged due to accidents when being placed randomly.

In some embodiments, the tank body 100 comprises a main body 160 and a guide pipe 170. The main body 160 defines an opening 171. The guide pipe 170 is gaplessly installed in the opening 171. The clamping groove 152 is defined in the guide pipe 170. The guide pipe 170 and the main body 160 are detachably connected by a method such as snapping, plugging, or clamping. The guide pipe 170 is selected from different types of guide pipes according to a size of the nozzle 500. For instance, the guide pipe 170 is selected from the guide pipes of different depths and diameters, to match the nozzle 500, making the storage of the nozzle 500 more convenient.

In some embodiments, the tank body 100 further comprises a sealing ring 180 disposed between the guide pipe 170 and the main body 160, so that the guide pipe 170 is gaplessly installed in the opening 171.

The sealing ring 180 is disposed between the guide pipe 170 and the main body 160. The sealing ring 180 ensures that a joint between the guide pipe 170 and the main body 160 is sealed, thereby realizing a sealed connection between the guide pipe 170 and the main body 160, preventing the fuel from leaking from the joint between the guide pipe 170 and the main body 160, preventing external contaminants from entering an interior of the fuel tank 10, and protecting the fuel from contamination.

In some embodiments, the fuel tank 10 further comprises a hose 600. The hose 600 is connected to the nozzle 500 and is communicates with the fuel outlet 120. At least one hose holder 190 is defined on an outer side wall of the tank body 100. The hose 600 is allowed to be snapped in the at least one hose holder 190. The fuel tank 10 comprises the hose 600, ensuring that the fuel is smoothly transported from the fuel outlet 120 to the nozzle 500 through the hose 600, so that the nozzle is able to transport the fuel to the external device. The hose 600 is clamped in the at least one hose holder 190 defined on the outer side wall of the tank body 100, so that the hose 600 is well stored and an overall structure of the fuel tank 10 is compact and effective.

For instance, the at least one hose holder 190 may comprises one or more hose holders 190 according to actual needs, and a position of the at least one hose holder 190 is determined according to actual needs. When the hose 600 is relatively long, the hose holders 190 (such as two hose holders 190, three hose holders 190, or four hose holders 190, etc.) are sequentially defined on the outer side wall of the tank body 100, and the hose 600 is allowed to be snapped in at least one of the hose holders 190 as needed.

For instance, the outer side wall of the tank body 100 is extended to form the at least one hose holder 190. Specifically, the at least one hose holder 190 on the outer side wall of the tank body 100 is formed by injection molding, blow molding, thermoplastic molding, or stamping. In another embodiment, the at least one hose holder 190 is a snapping groove, and the snapping groove matches a size of the hose 600, so that the hose 600 is clamped in the snapping groove.

In some embodiments, the tank body 100 further comprises a sealing cover. When the hose 600 is not installed, the sealing cover is configured to seal the fuel outlet 120. Specifically, the discharge pipe 200 is connected to the fuel outlet 120 and is partially disposed outside the tank body 100, that is, the second pipe 220 is connected to the hose 600, so that the hose 600 is connected to the fuel outlet 120 through the discharge pipe 200. When the discharge pipe 200 is not connected to the second pipe 220, the sealing cover seals the second pipe 220. The sealing cover is disposed on the tank body 100. For example, the sealing cover is connected to the second pipe 200 through a connector, so that the sealing cover is not easily lost and is convenient for sealing the second pipe 200. In some other examples, a clamping slot is disposed on the tank body 100, and the sealing cover is clamped in the clamping slot.

Figure 5:
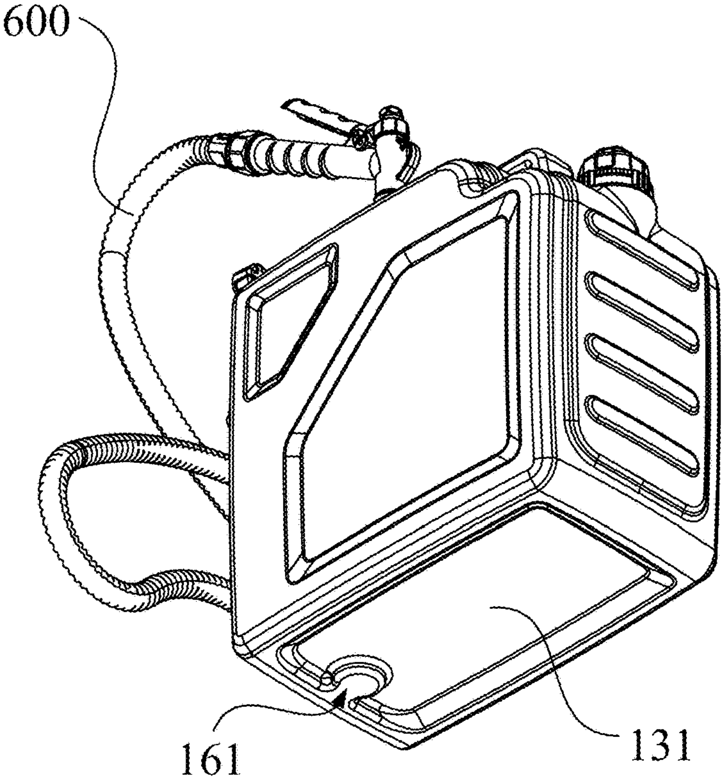
FIG. 5 is another structural schematic diagram of the fuel tank shown in FIG. 1.

FIG. 5 is another structural schematic diagram of the fuel tank shown in FIG. 1. In some embodiments, as shown in FIG. 5, a handle 155 is disposed on the top portion 150 of the tank body 100. A grabbing groove 161 is defined in the bottom portion 130 of the tank body 100. When in use, a user is able to grab the fuel tank 10 from two ends of the fuel tank 10 through the handle 155 on the top portion 150 of the fuel tank 10 and the grabbing groove 161 on the bottom portion 130 of the fuel tank 10, thereby ensuring effective grabbing and tilting of the fuel tank 10 when in use.

Figure 6:
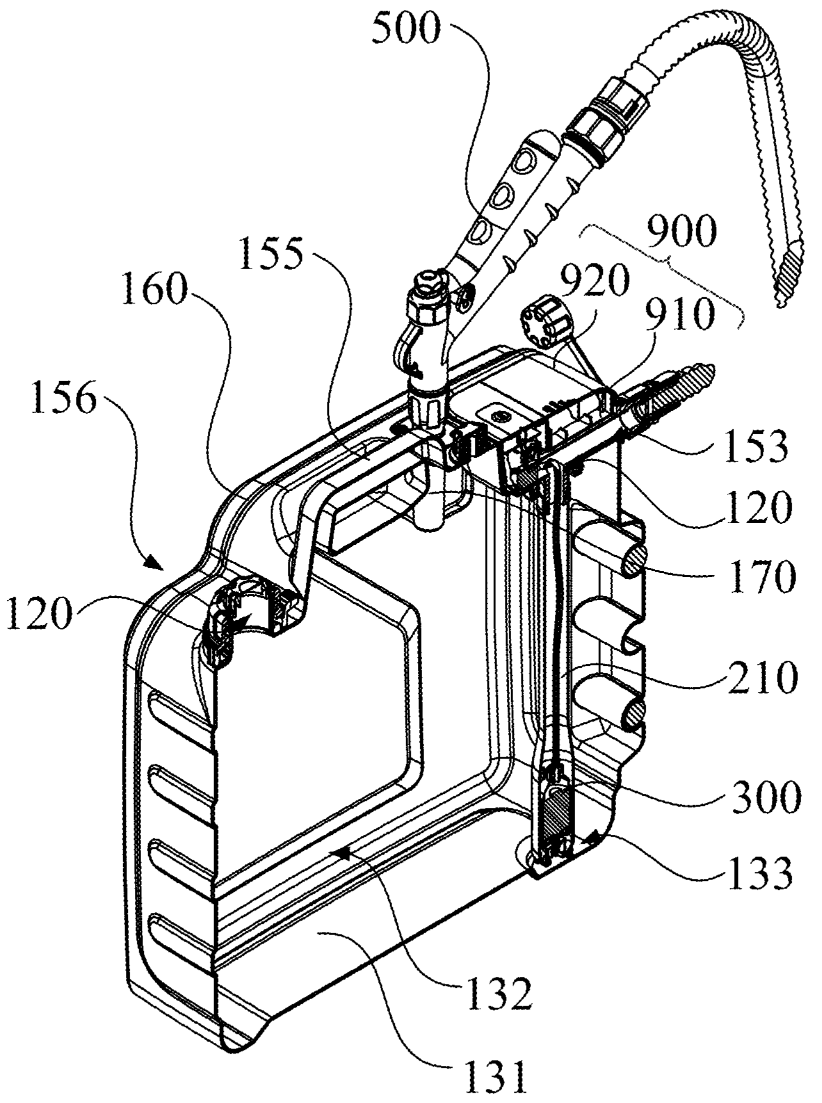
FIG. 6 is a third cross-sectional schematic diagram of the fuel tank shown in FIG. 1.

FIG. 6 is a third cross-sectional schematic diagram of the fuel tank shown in FIG. 1. In some embodiments, as shown in FIG. 6, the bottom portion 130 of the tank body 100 comprises a bottom plate 131, a fuel guide groove 132 is defined in the bottom plate 131. The fuel pump 300 is at least partially disposed in the fuel guide groove 132.

A bottom wall of the fuel guide groove 132 is located at a lowest position of the tank body. The fuel pump 300 is placed in the fuel guide groove 132, which facilitates the fuel pump 300 to pump the fuel at the lowest position in the fuel tank 10, ensuring that the fuel is effectively pumped by the fuel pump 300, which effectively reduces a residual amount of the fuel in the fuel tank 10 and improves a utilization rate of the fuel. For instance, the fuel guide groove 132 is disposed around the bottom plate 131.

In some embodiments, the fuel guide groove 132 comprises a limiting section 133. The fuel pump 300 is disposed in the limiting section 133. The limiting section 133 comprises a limiting side wall, and the limiting side wall is disposed around the fuel pump 300 and limits a position of the fuel pump 300. The limiting side wall is configured to prevent the fuel pump 300 from moving or swaying in the fuel tank 10, so as to ensure that the fuel pump 300 remains stable when pumping the fuel.

In some embodiments, the first pipe 210 is a hard pipe. The fuel pump 300 is clamped at one end of the first pipe 210 close to the bottom plate 131. At least one of the first pipe 210 and the fuel pump 300 abuts against the bottom plate 131.

The first pipe 210 is the hard pipe, which enables the first pipe to have a fixed shape and ensures structural stability of the first pipe 210. The fuel pump 300 is clamped in the first pipe 210, making an installation of the first pipe 21 simple and convenient. At least one of the fuel pump 300 and the first pipe 210 abuts against the bottom plate 131, which makes the fuel pump 300 stable during the refueling process and reduces the movement caused by vibration or fuel flow. Specifically, when the first pipe 210 abuts against the bottom plate 131, the first pipe 210 defines a channel for the fuel.

In some embodiments, the discharge pipe 200 further comprises a sleeve pipe 250. The sleeve pipe 250 is connected to one side of the second pipe 220 toward the first pipe 210. The sleeve pipe 250 is disposed in the fuel outlet 120 and is sleeved on the first pipe 210. The sleeve pipe 250 is gaplessly connected to the tank body 100. The sleeve pipe 250 is gaplessly installed in the fuel outlet 120, which seals the fuel outlet 120 of the tank body 100 without affecting a connection between the second pipe 220 and the first pipe 210. In some embodiments, a sealing rubber ring or sealant may be disposed between the sleeve pipe 250 and the tank body 100 for sealing.

In some embodiments, the second pipe 220 is disposed outside the tank body 100 and extends in a length direction of the tank body 100. The discharge pipe 200 mainly comprises the first pipe 210 disposed along the height direction of the tank body 100 and the second pipe 220 disposed along the length direction of the tank body 100. It is understood that the first pipe 210 is configured to lift the fuel in the tank body 100 to a predetermined height, and the second pipe 220 is configured to discharge the fuel. One end of the second pipe 220 is configured as a connection port to quickly connect with the hose 600, and the connection port is a threaded port or a port in other forms.

In some embodiments, a fuel inlet groove 156 is defined in the top portion 150 of the tank body 100, and the fuel inlet 110 is defined in a bottom wall of the fuel inlet groove 156. In this way, the fuel inlet 110 is located at a relatively low position of the top portion 150 of the tank body 100. For example, the fuel inlet groove 156 is disposed in an edge of the top portion 150 of the tank body 100, and the fuel inlet groove 156 only comprises one side wall extending in one direction. Alternatively, in other examples, the fuel inlet groove 156 is defined in a middle of the top portion 150 of the tank body 100, and the fuel inlet groove 156 comprises four side walls that are connected end by end.

Figure 7:
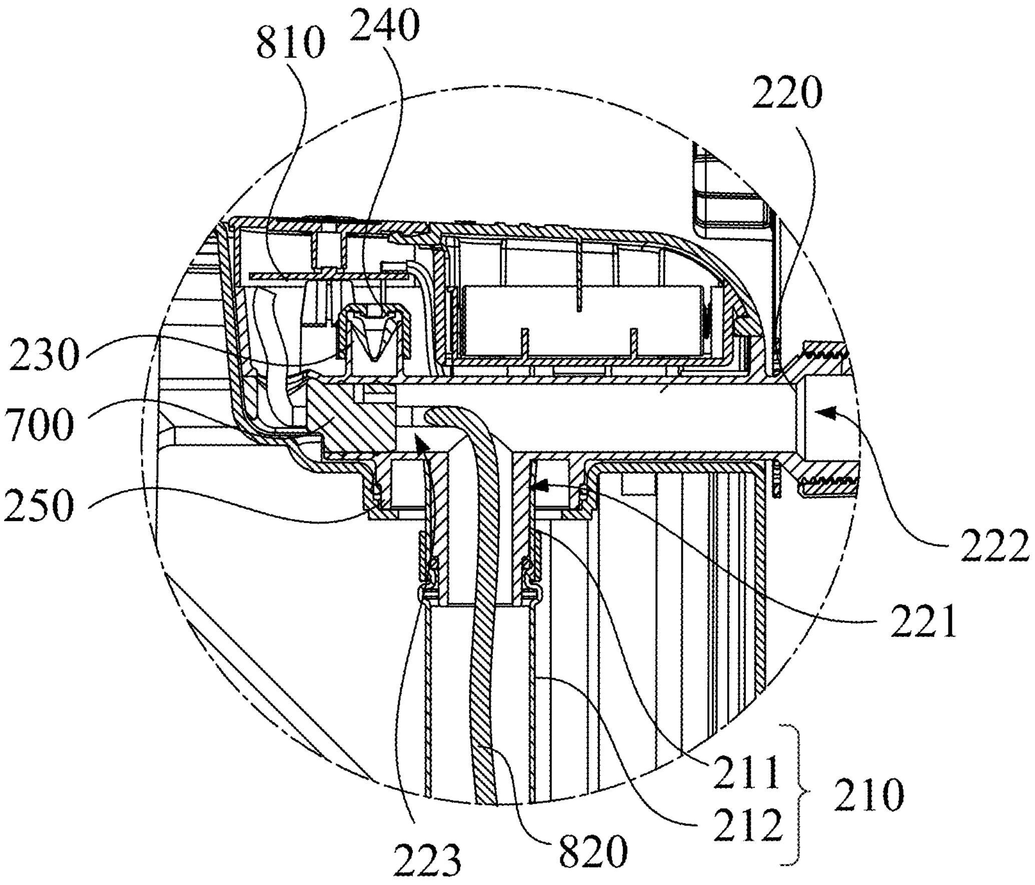
FIG. 7 is an enlarged schematic diagram of portion C of the fuel tank shown in FIG. 3.

FIG. 7 is an enlarged schematic diagram of portion C of the fuel tank shown in FIG. 3. In some embodiments, as shown in FIG. 7, the second pipe 220 defines a first opening 221, a second opening 222, and a third opening 223. The first opening 221 is communicated with the first pipe 210. The second opening 222 and the third opening 223 are disposed opposite to each other. The second opening 222 is configured for discharging fuel. The fuel tank 10 further comprises a sealing piece 700, a circuit board 810, and wires 820. The sealing piece 700 is gaplessly connected to the third opening 223. The wires 820 pass through the sealing piece 700 and are gaplessly connected to the sealing piece 700. A first end of each of the wires 820 is electrically connected to the circuit board 810, and a second end of each of the wires 820 is electrically connected to the fuel pump 300.

The second pipe 220 defines the first opening 221, the second opening 222, and the third opening 223. The first opening 221 is connected to the first pipe 210, and is configured to transport the fuel from the interior of the tank body 100 to the second pipe 220. The second opening 222 is connected to the fuel outlet 120 to ensure that the fuel is smoothly discharge from the second pipe 220 of the fuel tank 10. The sealing piece 700 is installed at the third opening 223 to ensure that when the wires pass through the second pipe 220 via the third opening 223, sealing performance of the second pipe 220 is not affected, thereby preventing fuel leakage. The wires are connected to the circuit board 810 and the fuel pump 300 through the third opening 223, so that the fuel pump 300 is controlled by the circuit board 810 to realize starting, stopping, speed adjustment, etc.

Figure 8:
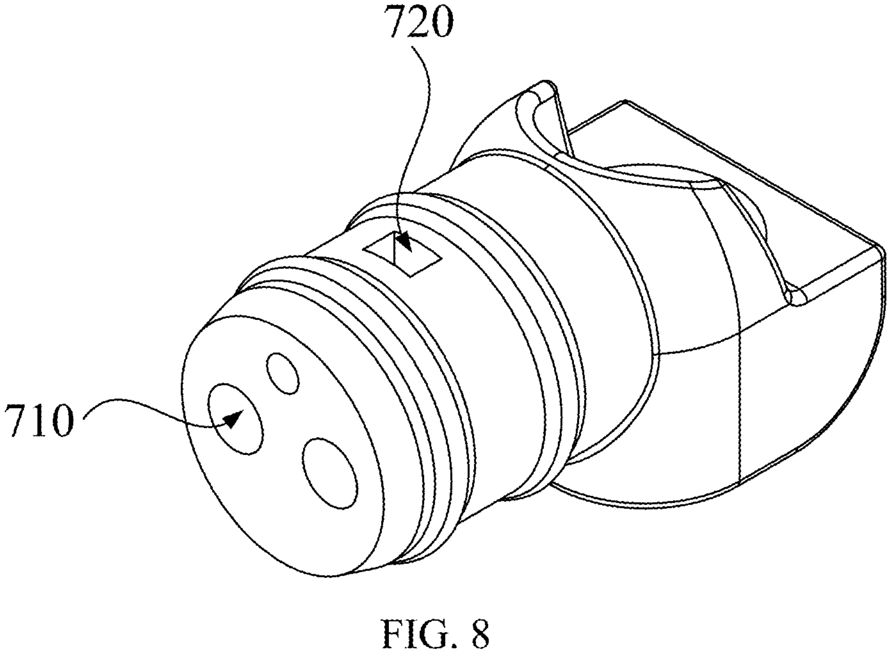
FIG. 8 is a schematic diagram of a sealing piece of the fuel tank shown in FIG. 1.

FIG. 8 is a schematic diagram of a sealing piece of the fuel tank shown in FIG. 1. In some embodiments, as shown in FIG. 8, the sealing piece 700 comprises wiring through holes 710. The wires 820 respectively pass through the wiring through holes 710 and are respectively in interference fit with the wiring through holes 710. The wiring through holes defines channels in the sealing piece 700 for the wires to pass through, so that the wires are able to connect to the fuel pump 300 and the circuit board 810. The interference fit between the wires and the wiring through holes 710 allows the wires to be tightly fixed in the wiring through holes, which helps maintain stability of the wires and prevents the wires from loosening during the use of the fuel tank 10. In addition, the interference fit also enhances the sealing performance of the sealing piece 700, and preventing the fuel leakage or external contaminants from entering even if the wires pass through the wiring through holes.

In some embodiments, a mounting groove 153 is defined in the top portion 150 of the tank body 100. The fuel outlet 120 is defined in a bottom wall of the mounting groove 153. An accommodating groove is defined in the bottom wall of the mounting groove 153. The second pipe 220 is partially disposed in the accommodating groove, so that the second pipe is easily installed. The accommodating groove saves an installing space while well fixing the second pipe In some embodiments, the fuel tank 10 further comprises an electronic box 900. The electronic box 900 comprises a base 910 and an outlet cap 920. The base 910 is installed in the mounting groove 153. The outlet cap 920 covers the base 910. The second pipe 220 is disposed on the base 910. The base 910 of the electronic box 900 is integrated with the second pipe 220, which makes a structure of the fuel tank 10 compact and is simpler to install.

In some embodiments, the circuit board 810 is disposed on one side of the second pipe 220 away from the first pipe 210 and is located between the base 910 and the outlet cap 920. A space between the base 910 and the outlet cap 920 is configured to install electronic devices such as the circuit board 810, and the circuit board 810 is disposed above the base 910 to connect to the wires passing through the sealing piece 700 in the base 910.

In some embodiments, the electronic devices such as batteries and keypads are installed in the electronic box 900.

In some embodiments, the first pipe 210 comprises a first section 211 and a second section 212. The first section 211 is detachably connected to the second section 212. The first section 211 is fixedly connected to the second pipe 220. The second section 212 is gaplessly connected to the first section 211.

The first section 211 is detachably connected to the second section 212, so as to form the first pipe 210 that is relatively long.

The first section 211 and the second pipe 220 are fixedly connected to facilitate a connection between the first section 211 and the second pipe 220. For example, the first section 211 and the second pipe 220 may be integrally formed or fixed by hot melting or other methods. In some embodiments, the first section 211 and the second section 212 may be sealed by a seal.

In some embodiments, the discharge pipe 200 further comprises a vent pipe 230. The vent pipe 230 is connected to the second pipe 220 and is communicated with the second pipe 220. The fuel tank 10 further comprises a vent valve 240. The vent valve 240 is installed on one end of the vent pipe 230 away from the second pipe 220. The sealing piece 700 further defines a vent channel. A first end of the vent channel 720 is communicated with the second pipe 220, and a second end of the vent channel 720 is communicated with the vent pipe 230.

The vent pipe 230 is connected to and communicated with the second pipe 220, so that the air in the second pipe 220 is discharged during the refueling process or a fuel flow process. The vent valve 240 controls air flow between the interior of the fuel tank 10 and the vent pipe 230, and the vent valve is configured to open or close the vent channel 720, which helps to maintain a pressure balance in the interior of the fuel tank 10. The vent channel 720 is defined in the sealing piece 700, providing a vent path from the second pipe 220 to the vent pipe 230, so that the air accumulated in the second pipe 220 is guided and discharged to the vent pipe 230.

Figure 9:
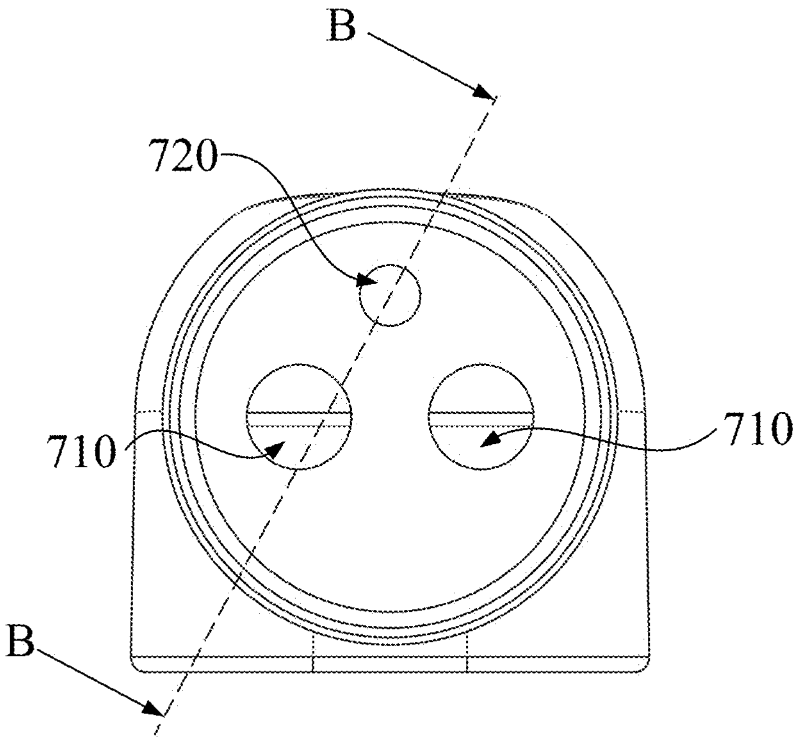
FIG. 9 is another schematic diagram of a sealing piece of the fuel tank shown in FIG. 1.
Figure 10:
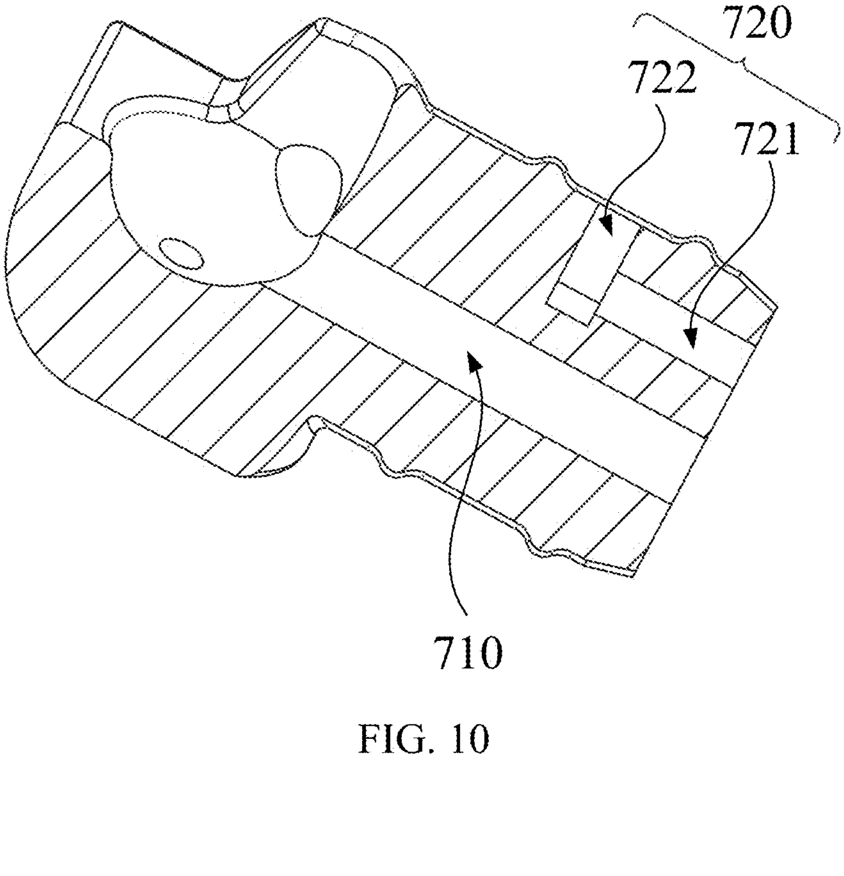
FIG. 10 is a cross-sectional schematic diagram of the fuel tank taken along a line B-B shown in FIG. 9.

FIG. 9 is another schematic diagram of a sealing piece of the fuel tank shown in FIG. 1. FIG. 10 is a cross-sectional schematic diagram of the fuel tank taken along a line B-B shown in FIG. 9. In some embodiments, as shown in FIGS. 9 and 10, the wiring through holes 710 penetrate through the sealing piece 700 in an extending direction of the second pipe 220. The wiring through holes 710 are spaced apart from the vent channel 720. The vent pipe 230 is connected to one side of the second pipe 220 away from the first pipe 210. The vent channel 720 comprises a first vent section 721 and a second vent section 722. The first vent section 721 and the second vent section 722 are communicated with each other. The first vent section 721 extends in a width direction of the tank body 100 and is communicated with the second pipe 220. The second vent section 722 extends in the height direction of the tank body 100 and is communicated with the vent pipe 230.

The wiring through holes 710 and the vent channel 720 are integrated on the sealing piece 700, which simplifies a design and a manufacture of the fuel tank 10. Moreover, the wiring through holes 710 penetrate through the sealing piece 700 along the extending direction of the second pipe 220, and the wiring through holes 710 and the vent channel 720 are spaced apart from each other. By such arrangements, an electrical circuit and a vent path are separated from each other and potential interference is reduced. The first vent section 721 extends in the width direction of the tank body 100 and is connected to the second pipe 220, which provides a vent path in the width direction of the fuel tank 10. The second vent section 722 extends in the height direction of the tank body 100 and is connected to the vent pipe 230, allowing the air to flow in the height direction of the fuel tank 10 and finally be discharged through the vent pipe 230. By arranging the vent sections that are communicated in different directions, the air is more effectively discharged.

The above contents illustrate embodiments of the present disclosure. In the present disclosure, specific embodiments are applied to illustrate the principles and implementations of the present disclosure. The above description of the embodiments is only used to better understand methods and core ideas of the present disclosure. Meanwhile, according to the ideas of the present disclosure, changes are made in the specific implementations and the application scope by those skilled in the art. Therefore, the contents of the specification should not be regarded as a limitation of the present disclosure.

What is claimed is:

1. A fuel tank, comprising:

a tank body, a discharge pipe, and a fuel pump;

wherein the tank body comprises a bottom portion and a top portion disposed opposite to the bottom portion; a fuel inlet and a fuel outlet are defined in the top portion of the tank body; the discharge pipe comprises a first pipe and a second pipe; the first pipe and the second pipe are connected to each other; the first pipe is disposed in the tank body and extends in a height direction of the tank body; the second pipe is communicated with the fuel outlet; the fuel pump is disposed in the first pipe;

wherein the first pipe defines a first end surface away from the bottom portion of the tank body; a bottom portion of the fuel inlet is lower than the first end surface of the first pipe in the height direction of the tank body.

2. The fuel tank according to claim 1, wherein a fuel inlet groove is defined in the top portion of the tank body; the fuel inlet is defined in a bottom wall of the fuel inlet groove.

3. The fuel tank according to claim 1, wherein the fuel tank further comprises a nozzle communicated with the fuel outlet; the fuel pump is disposed close to the bottom portion of the tank body; when the nozzle is closed, air is sealed in the discharge pipe.

4. The fuel tank according to claim 3, wherein a clamping groove is defined in the top portion of the tank body; the nozzle is insertable into the clamping groove.

5. The fuel tank according to claim 4, wherein the tank body comprises a main body and a guide pipe; the main body defines an opening; the guide pipe is gaplessly installed in the opening; the clamping groove is defined in the guide pipe.

6. The fuel tank according to claim 5, wherein the tank body further comprises a sealing ring disposed between the guide pipe and the main body, so that the guide pipe is gaplessly installed in the opening.

7. The fuel tank according to claim 3, wherein the fuel tank further comprises a hose; the hose is connected to the nozzle and is communicates with the fuel outlet; at least one hose holder is defined on an outer side wall of the tank body; the hose is allowed to be snapped in the at least one hose holder.

8. The fuel tank according to claim 1, wherein a handle is disposed on the top portion of the tank body; a grabbing groove is defined in the bottom portion of the tank body.

9. The fuel tank according to claim 1, wherein the bottom portion of the tank body comprises a bottom plate; a fuel guide groove is defined in the bottom plate; the fuel pump is at least partially disposed in the fuel guide groove.

10. The fuel tank according to claim 9, wherein the fuel guide groove comprises a limiting section; the fuel pump is disposed in the limiting section; the limiting section comprises a limiting side wall, and the limiting side wall is disposed around the fuel pump and limits a position of the fuel pump.

11. The fuel tank according to claim 10, wherein the first pipe is a hard pipe; the fuel pump is clamped at one end of the first pipe close to the bottom plate; at least one of the first pipe and the fuel pump abuts against the bottom plate.

12. The fuel tank according to claim 1, wherein the discharge pipe further comprises a sleeve pipe; the sleeve pipe is connected to one side of the second pipe toward the first pipe; the sleeve pipe is disposed in the fuel outlet and is sleeved on the first pipe; the sleeve pipe is gaplessly connected to the tank body.

13. The fuel tank according to claim 12, wherein the second pipe is disposed outside the tank body and extends along a length direction of the tank body.

14. The fuel tank according to claim 13, wherein the second pipe defines a first opening, a second opening, and a third opening; the first opening is communicated with the first pipe; the second opening and the third opening are disposed opposite to each other; the second opening is configured for discharging fuel;

wherein the fuel tank further comprises a sealing piece, a circuit board, and wires; the sealing piece is gaplessly connected to the third opening; the wires pass through the sealing piece and are gaplessly connected to the sealing piece; a first end of each of the wires is electrically connected to the circuit board, and a second end of each of the wires is electrically connected to the fuel pump.

15. The fuel tank according to claim 14, wherein the sealing piece comprises wiring through holes; the wires respectively pass through the wiring through holes and are respectively in interference fit with the wiring through holes.

16. The fuel tank according to claim 13, wherein a mounting groove is defined in the top portion of the tank body; the fuel outlet is defined in a bottom wall of the mounting groove; an accommodating groove is defined in the bottom wall of the mounting groove; the second pipe is partially disposed in the accommodating groove.

17. The fuel tank according to claim 16, wherein the fuel tank further comprises an electronic box; the electronic box comprises a base and an outlet cap; the base is installed in the mounting groove; the outlet cap covers the base; the second pipe is disposed on the base.

18. The fuel tank according to claim 13, wherein the first pipe comprises a first section and a second section; the first section is detachably connected to the second section; the first section is fixedly connected to the second pipe; the second section is gaplessly connected to the first section.

19. The fuel tank according to claim 15, wherein the discharge pipe further comprises a vent pipe; the vent pipe is connected to the second pipe and is communicated with the second pipe;

wherein the fuel tank further comprises a vent valve; the vent valve is installed on one end of the vent pipe away from the second pipe; the sealing piece further defines a vent channel; a first end of the vent channel is communicated with the second pipe, and a second end of the vent channel is communicated with the vent pipe.

20. The fuel tank according to claim 19, wherein the wiring through holes penetrate through the sealing piece in an extending direction of the second pipe; the wiring through holes are spaced apart from the vent channel; the vent pipe is connected to one side of the second pipe away from the first pipe;

wherein the vent channel comprises a first vent section and a second vent section; the first vent section and the second vent section are communicated with each other; the first vent section extends in a width direction of the tank body and is communicated with the second pipe; the second vent section extends in the height direction of the tank body and is communicated with the vent pipe.

* * * * *